Figure 1:
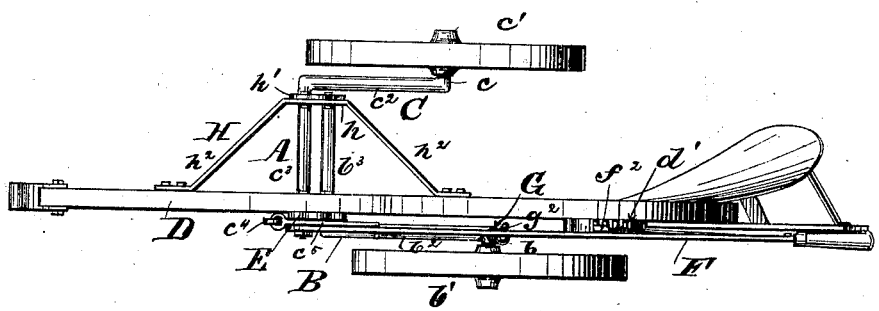

(No Model.) 3 Sheets—Sheet 1.

G. MOORE.
WHEEL PLOW.

No. 313,947. Patented Mar. 17, 1885.

Attest
Carl Spengel
Leopold Adler

Inventor
Gilpin Moore
By Herbert D. Blakmore Atty

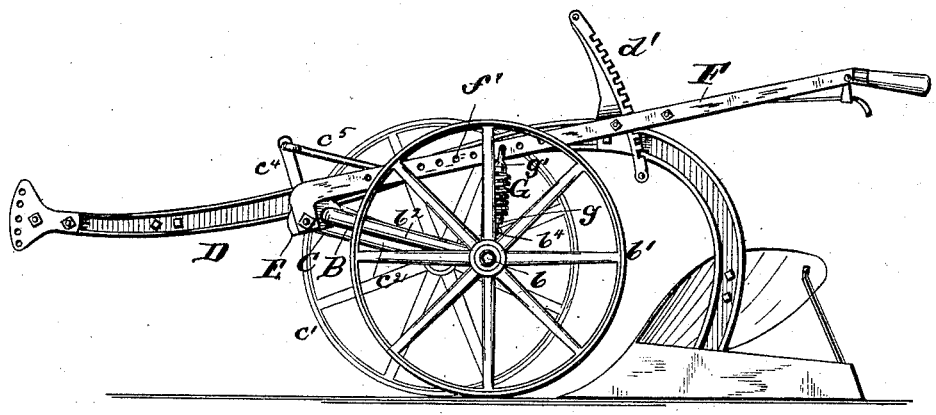

(No Model.) 3 Sheets—Sheet 3.
G. MOORE.
WHEEL PLOW.
No. 313,947. Patented Mar. 17, 1885.
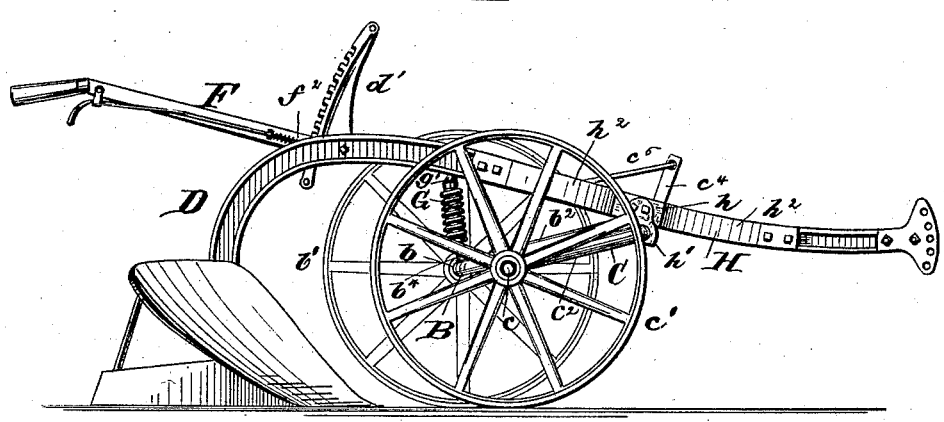
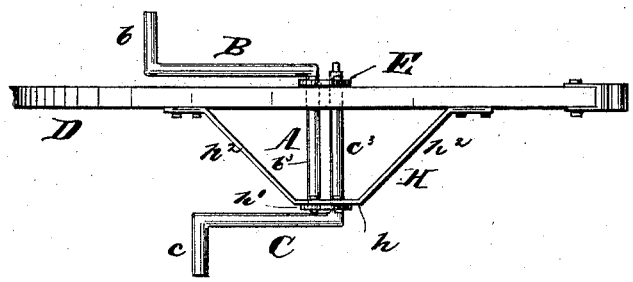
Attest
Carl Spengel
Leopold Aden
Inventor
Gilpin Moore
By Herbert D. Blakimore Atty.
N. PETERS. Photo-Lithographer, Washington, D. C.

UNITED STATES PATENT OFFICE.

GILPIN MOORE, OF ROCK ISLAND, ASSIGNOR TO DEERE & COMPANY, OF MOLINE, ILLINOIS.

WHEEL-PLOW.

SPECIFICATION forming part of Letters Patent No. 313,947, dated March 17, 1885.

Application filed November 10, 1884. (No model.)

*To all whom it may concern:*

Be it known that I, GILPIN MOORE, of the city of Rock Island, in the county of Rock Island and State of Illinois, have invented certain new and useful Improvements in Wheel-Plows, of which the following is a specification.

My invention relates to improvements in that class of sulky or wheel plows in which the carrying-wheels are supported on a bent or crank axle, which forms also a support for the plow-beam and dependent devices.

It consists in the employment of a double-crank or bent axle, one crank for each wheel, the vertical portions of which are inclined toward the forward part of the plow, the upper horizontal end of each extended to or near the vertically-inclined bend of the opposite crank, jointly, severally, and independently adjustable to vary the relative horizontal planes of the carrying-wheels, to adapt the plow to any desired depth of furrow or to the character of the plowing to be done.

It consists, further, in actuating the crank supporting the land-wheel to cause said wheel to assume a proper relative distance above the plane of the furrow-wheel, and hold the plow level or in a horizontal plane in ordinary plowing by means of a single lever swiveled to the upper horizontal extension of the opposing crank as a fulcrum, and operating by a spring-pawl connection with a notched segment rigidly secured to the rear of the plow-beam.

It consists, further, in adjusting the crank supporting the furrow-wheel to cause it to assume its proper relative position with reference to certain adjustments of the latter, and thus retain the plow in a perfect horizontal plane by a link-bar swiveled at one end upon a vertically-extending projection near the end of the horizontal extension of said wheel-crank, and its free hooked end engaging with perforations in the land-wheel-crank lever, and held in such adjustment by a pin or other suitable means.

It consists, further, in the combination, with the land-wheel crank, of a yielding vertical spring-connection between the lower portion of its vertically-inclined bend and the land-wheel-crank lever, allowing to said wheel sufficient vertical play to preserve the plow in a horizontal plane when passing over slight obstructions, roughness, or unevenness in the ground, preventing a jerky fitful motion, and affording an easy and steady draft.

It consists, further, in the combination, with the double-crank axle upon which the wheels are journaled, the vertical portions of which incline toward the front of the plow, the upper horizontal end of each extended to the vertically-inclined bend of the opposite crank, and such horizontal end of the furrow-crank journaled into the fulcrum end of the land-wheel-crank lever, of a brace with straight body portion, to which is attached a block through which the upper extension of the furrow-crank passes, and into which is journaled the horizontal extension of the land-wheel crank, and its arms bolted or otherwise rigidly secured to the furrow side of the plow-beam.

It consists, further, in supporting the plow-beam, with its dependent devices, directly upon the double-crank axle by means of a block secured thereto or hung thereupon, dispensing with a seat, complicated plow-frame, and draft attachments connected therewith, permitting the carrying-wheels to be journaled close together, and making a compact and simple machine, and in the various other combinations and details of construction, hereinafter described and claimed.

Figure 4:
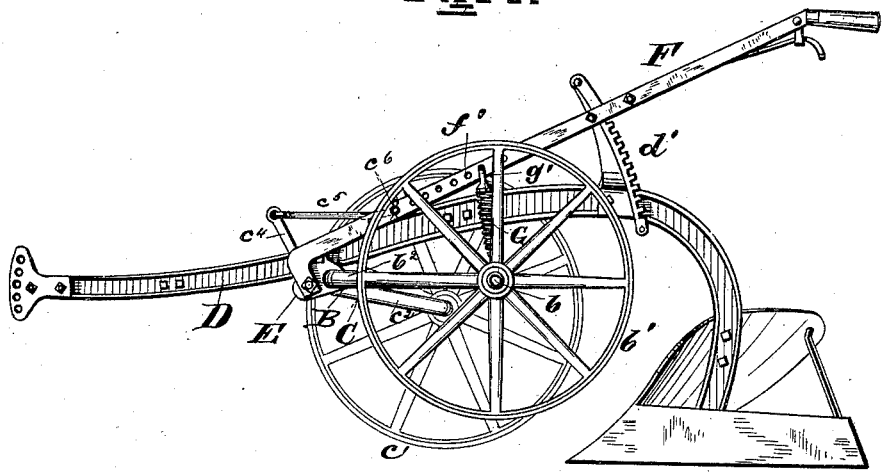

In the drawings, Figure 1 is a top view of a plow embodying my invention, with the wheels adjusted to the same horizontal plane, and thus in position for opening furrows, or in the position the plow is made to assume when at rest. Fig. 2 is a land-side elevation of Fig. 1. Fig. 3 is a furrow-side elevation of Fig. 1. Fig. 4 is a side elevation showing the parts in position for ordinary plowing; and Fig. 5 is a plan view of the double-crank axle, plow-beam brace, and beam plate or support.

A is the axle, consisting of two bent or cranked bars, B C, with spindles $b$ $c$ formed on their lower horizontal ends, upon which the carrying-wheels $b'$ $c'$ of the plow are journaled. The vertical portion of each crank $b^2$ $c^2$ is inclined at an angle of, say, thirty degrees toward the fore part of the plow, and the upper horizontal end of each crank $b^3$ $c^3$ is extended to or near the vertically-inclined bend of the opposite crank, with the crank supporting the furrow-wheel slightly in advance of the land-wheel crank. This extension of the upper ends of the cranks not only affords additional strength to the device without any considerable sacrifice of material, but serves also as a bed upon which the plow-beam and attendant mechanism are supported, and affords adequate means therefor.

D is the plow-beam, carrying on its rear end the plow, and may have suitably attached at or about its center a colter of any form or style desired. This beam is bolted or otherwise rigidly secured to a block, E, supported or hung upon the double-crank axle by the horizontal ends thereof passing through parallel transverse holes in the lower portion of said block, its lateral displacement on said axle being prevented by a stop-nut or other suitable means.

F is the land-wheel-crank lever, having its fulcrum end $f$ journaled to the upper horizontal extension, $c^3$, of the furrow-wheel crank C, and forming the outer support to such crank. This lever has several perforations, $f'$, to receive the hooked bars forming a part of the connection with both of the axle-cranks, as hereinafter described; and is provided with a pawl, $f^2$, adapted to be sprung into engagement with the teeth of a notched segment or rack-bar, $d'$, rigidly secured to the plow-beam. Upon the upper face of the lower extremity of the vertically-inclined bend of the land-wheel crank is a slight projection or lug, $b^4$, through a hole in which is inserted one end of a heavy coiled or spiral spring, G, or a hook, $g$, attached to one of the bottom coils thereof, the other end of such spring connected by a hooked bar, $g'$, similarly attached to one of its upper coils, to the lever F by inserting the hook of such bar into one of the perforations $f'$ in said lever, to which, when adjusted, it may be secured against displacement by a pin, $g^2$, or other suitable means.

To the horizontal extension $c^3$ of the furrow-crank C, near where it is journaled into the lever F, is rigidly attached a vertical projection, $c^4$, into the upper end of which is linked a pin or bar, $c^5$, having a hook at its rear end, which is inserted into one of the perforations $f'$ of the lever F and secured against displacement by the pin $c^6$.

H is a brace consisting of a flat body portion, $h$, and two arms, $h^2$ $h^2$. The flat body portion, which is parallel to the plow-beam, is bolted to a block, $h'$, similar to that to which the plow-beam is attached. This block has holes in its lower portion, through the first of which the furrow-wheel crank C passes, and into the latter the land-wheel crank B is journaled, forming the outer support for such last-named axle-crank. The two arms $h^2$ $h^2$ of the brace flare outwardly toward the plow-beam, to which they are secured by bolts, or otherwise rigidly attached thereto.

Figs. 2 and 3 show a plow embodying my invention with the wheels in the same horizontal plane, the position required for opening a furrow, or that which the plow is made to assume when at rest. When the furrow is opened and a second one is to be cut, or, in other words, in ordinary plowing, after the first furrow has been cut, the lever, acting through the spring-connection with the land-wheel crank to raise the land-wheel, is moved upward (lifting said wheel vertically and rearward in the arc of a circle described by said inclined portion of the crank) until the distance between the planes of the two wheels is equal to the depth of the furrow, when it is locked in its adjusted position by springing the pawl connected with said lever into a notch in the segment-rack. This lever having a connection also with the furrow-wheel crank, any movement of the lever in adjusting the land-wheel will operate to actuate the furrow-wheel in the opposite direction. The relative distance between the wheels is thus effected by the action of this single lever, with less travel or movement of the lever than could be effected by a lever operating to adjust the land-wheel only, and the danger of throwing the plow out of a horizontal plane by raising the land-wheel a considerable distance above the furrow-wheel without some compensatory device for lowering the latter wheel or for leveling the plow, is thereby avoided.

In ordinary plowing, or in plowing an ordinarily deep furrow, if the spring and link connections with the axle-cranks have the proper relative adjustment, this double action of the lever will be found sufficient to preserve the plow in a perfect horizontal plane. If, however, an unusually deep or shallow furrow is to be cut, it will be advisable to adjust the pin to a perforation farther backward or forward, as the case may be. The spindle to which the land-wheel is journaled being at the bottom of the vertical bend of the axle inclined at an angle of, say, thirty degrees to the spring-connection with the lever, little power is required to actuate the lever and lift the wheel to any desired adjustment. The spring-connection between the land-wheel crank and the lever acts with a yielding pressure upon the land-wheel, permitting it to pass over slight obstructions, unevenness, or roughness in the soil without disturbing its then fixed adjustment, or affecting to any appreciable degree the adjustment of the opposite wheel or the horizontal position of the plow. The carrying-wheels, mounted upon the axle-cranks, the upper horizontal extensions of which are supported, one in the fulcrum end of the lever, the other in the lower portion of the brace-plate, and the beam-plate hung thereupon, form a bed or support upon which the plow-beam and dependent devices are directly attached, and, with the brace, dispense with the necessity of a complicated frame, and consequent complex draft attachments. The draft is directly from the beam, allowing the plow to turn in the furrow without danger of twisting the parts or destroying or breaking the plow. The wheels are thereby journaled close together, permitting the sulky to plow very near stumps, trees, or other obstructions in the ground, and affording a compact simple machine, easily handled, readily adjusted, and with little liability to get out of order. A seat for the rider I also dispense with, lessening the draft by his weight, and thereby avoiding the necessity of providing mechanism for assisting the driver in making the necessary adjustments of the plow, which, without some such means against his dead-weight, would require the exertion of considerable force.

I have described my invention with reference to the employment of a single beam and plow; but it is obvious that with a few formal changes the same mechanism, substantially, may be used in connection with a beam or beams carrying two or more plows with equal effectiveness.

I claim—

1. In combination with crank-axles B C, beam D, and beam-plate E, pivoted lever F, and spring G, attached at one end to the lever and at the opposite end to the lower or moving end of the crank-axle B, and adapted to lift the axle without other connection between the axle and lever.

2. In combination with a plow, its beam and beam-plate, and with two independent crank-axles, a pivoted lever connected with one of the crank-axles by a spring or yielding connection, and connected with the other crank-axle by a link capable of adjustment, substantially as shown and described.

3. In a sulky or wheel plow, a crank or bent axle supporting upon its lower end the land-wheel, its vertical portion inclined toward the front of the plow, and actuated by a lever fulcrumed upon the upper horizontal end of the furrow-crank, and operating, by a vertical spring or other flexible connection with the lower part of the crank, to raise the land-wheel, as and for the purpose set forth.

4. In a sulky or wheel plow, a crank or bent axle supporting upon its lower end the land-wheel, its vertical portion inclined forward, its upper horizontal end extended to the opposite crank, and journaled into the lower portion of a block secured to a brace connected to the furrow side of the plow-beam, and actuated by a lever fulcrumed upon the upper horizontal end of a similar extension of the furrow-crank, and operating, by a vertical spring or other flexible connection with the lower part of the crank, to raise or lower said land-wheel, as and for the purpose set forth.

5. In a sulky or wheel plow, a crank or bent axle supporting upon its lower end the land-wheel, its vertical portion inclined forward, its upper horizontal end extended to the opposite crank, and journaled into a block secured to a brace connected to the furrow side of the plow-beam, and actuated by a lever, fulcrumed upon the upper horizontal end of a similar extension of the furrow-crank, and operating, by a vertical spring or other flexible connection with the lower part of said land-wheel crank, to raise and lower said wheel, and a spring-pawl connection with said lever, adapted to engage with the teeth of a notched segment upon the rear of the plow-beam and lock the land-wheel in any desired adjustment, as described, for the purpose set forth.

6. In a sulky or wheel plow, a crank or bent axle supporting upon its lower end the furrow-wheel, its vertical portion inclined forward, and adjustable through a link-connection near the upper end of said crank, with a lever fulcrumed to said upper end to raise or lower said wheel, as and for the purpose set forth.

7. In a sulky or wheel plow, a crank or bent axle supporting upon its lower end the furrow-wheel, its vertical portion inclined forward, and actuated jointly with the land-wheel crank by a lever fulcrumed upon the upper horizontal end of the furrow-crank and operating by a link-connection between said crank and lever and a vertical spring or flexible connection with the lower part of the land-wheel crank and said lever, as and for the purpose set forth.

8. In a sulky or wheel plow, a crank or bent axle supporting upon its lower end the furrow-wheel, its vertical portion inclined forward, and actuated jointly with the land-wheel crank by a lever fulcrumed upon the upper horizontal end of the furrow-crank, and operating by a link-connection between said crank and lever and a vertical spring or flexible connection with the lower part of the land-wheel crank and said lever, and a spring-pawl connection with said lever adapted to engage with the teeth of a notched segment upon the rear of the plow-beam and lock the wheels in any desired adjustment.

9. The combination, in a sulky or wheel plow, with the land-wheel supported upon its crank, of a vertical spring hung from the lever, fulcrumed to the upper horizontal end of the furrow-wheel crank, and acting with a yielding pressure upon said land-wheel by a connection with the lower portion of its crank, substantially as described, for the purpose set forth.

10. In a sulky or wheel plow, the combination, with the double-crank axle upon which the wheels are journaled, the vertical portions of which incline forward, the upper horizontal end of each extending to the vertically-inclined bend of the opposite crank, and such horizontal end of the furrow-crank journaled into the fulcrum end of the land-wheel lever, of a brace with straight body portion, to which is secured a plate through which the upper extension of the furrow-wheel crank passes, and into which is journaled the extension of the land-wheel crank, having its arms bolted or otherwise rigidly secured to the furrow side of the plow-beam, substantially as described.

11. In a sulky or wheel plow, the combination of the double-crank axle, carrying wheels, beam plate or support to which the plow-beam is attached, beam-brace and brace-plate, actuating-lever having spring-connection with the land-wheel crank and link-connection with the furrow-wheel crank, and spring-pawl adapted to engage with the notches on a segment-bar secured to the beam, all constructed and operating substantially as described.

GILPIN MOORE.

Witnesses:
E. C. CROPPER,
EDWARD H. GUYER.